US006482330B1

(12) United States Patent
Bajorek

(10) Patent No.: US 6,482,330 B1
(45) Date of Patent: Nov. 19, 2002

(54) METHOD FOR MANUFACTURING A DATA STORAGE CARD

(75) Inventor: Christopher H. Bajorek, Los Gatos, CA (US)

(73) Assignees: Komag, Inc., San Jose, CA (US); UltraCard, Inc., Los Gatos, CA (US)

( * ) Notice: Subject to any disclaimer, the term of this patent is extended or adjusted under 35 U.S.C. 154(b) by 0 days.

(21) Appl. No.: 09/410,679

(22) Filed: Oct. 1, 1999

(51) Int. Cl.[7] ................................. B44C 1/22
(52) U.S. Cl. ...................... 216/22; 216/83; 360/113; 219/121.67; 29/603.01; 29/603.13; 29/603.18; 204/192.1
(58) Field of Search ............................ 216/22, 83, 96; 360/113; 219/121.67; 29/603.01, 603.13, 603.18; 204/192.1

(56) References Cited

U.S. PATENT DOCUMENTS

| | | | |
|---|---|---|---|
| 3,808,404 A | 4/1974 | Riggs ................... | 235/61.12 M |
| 4,002,804 A | 1/1977 | Akashi et al. .......... | 428/539 |
| 4,066,873 A | 1/1978 | Schatz ................. | 235/487 |
| 4,100,011 A | 7/1978 | Foote .................. | 156/272 |
| 4,197,988 A | 4/1980 | Moss et al. ............ | 235/449 |
| 4,325,182 A * | 4/1982 | Tefft et al. ........... | 29/583 |
| 4,592,042 A | 5/1986 | Lemelson et al. ........ | 369/258 |
| 4,707,593 A | 11/1987 | Murata et al. .......... | 235/487 |
| 4,742,410 A | 5/1988 | Smith .................. | 360/105 |
| 4,788,156 A | 11/1988 | Stoneham et al. ........ | 437/22 |
| 4,863,546 A | 9/1989 | Melzer et al. .......... | 156/308 |
| 4,871,523 A | 10/1989 | Okuno .................. | 235/479 |
| 4,938,830 A | 7/1990 | Cannistra .............. | 156/270 |
| 5,047,296 A * | 9/1991 | Miltenberger et al. .... | 428/694 |

(List continued on next page.)

FOREIGN PATENT DOCUMENTS

| | | |
|---|---|---|
| DE | 19601176 A1 | 7/1997 |
| DE | 29804131 U1 | 8/1998 |
| EP | 0106533 A2 | 4/1984 |
| EP | 0451024 A1 | 10/1991 |
| EP | 0833282 A1 | 4/1998 |
| WO | WO 96/11098 | 4/1996 |

OTHER PUBLICATIONS

"Magnetic Stripes" (3 pages).
A. Bergeron, et al., "Structure of the Interfacial Region Between Polycarbonate and Plasma–Deposited $SiN_{1.3}$ and $SiO_2$ Optical Coatings Studied by Ellipsometry", J. Vac. Sci. Technol., vol. 16, Issue 6, pp. 3227–3234, Nov. 1998.
Morita et al., "The Durability of New Rigid Disks by Molded Plastic Substrates", J. Appl. Phys., vol. 75, Issue 10, p. 6162, May 15, 1994.
Smart Card Basics, bearing the date Aug. 12, 1999.
ICMA Quick Card Facts, bearing the date Aug. 10, 1999.
Magnetic Stripe Technology, bearing the date Jul. 30, 1999.
"Welcome to Smart Cards", bearing a copyright notice dated 1998.
Dialog printout.

*Primary Examiner*—Robert Kunemund
*Assistant Examiner*—Shamim Ahmed

(57) ABSTRACT

A method for making a credit card (or other type of data storing card) comprising a magnetic strip includes the step of depositing a magnetic recording layer on a substrate, cutting the substrate into strips, and mounting the strips onto the credit card. In one embodiment, the strips comprise glass that is sufficiently thin to be bendable. The magnetic recording layer is sputtered onto the glass using a high temperature sputtering apparatus. In another embodiment, the substrate is a metal foil. The data recording capacity of the magnetic strip is greater than that which can be achieved by using particulate media.

46 Claims, 6 Drawing Sheets

U.S. PATENT DOCUMENTS

| | | | |
|---|---|---|---|
| 5,087,481 A | * 2/1992 | Chen et al. | 427/129 |
| 5,107,099 A | 4/1992 | Smith | 235/449 |
| 5,395,672 A | * 3/1995 | Pingaud | 428/141 |
| 5,435,878 A | 7/1995 | Delmar et al. | 156/272.2 |
| 5,530,232 A | 6/1996 | Taylor | 235/380 |
| 5,534,324 A | * 7/1996 | Sugita et al. | 428/694 T |
| 5,567,537 A | * 10/1996 | Yoshizawa et al. | 343/787 |
| 5,612,403 A | 3/1997 | Nguyen et al. | 524/440 |
| 5,844,230 A | * 12/1998 | Lalonde | 235/449 |
| 6,288,870 B1 | * 9/2001 | Saliba | 360/121 |

* cited by examiner

METHOD FOR MANUFACTURING A DATA STORAGE CARD

BACKGROUND OF THE INVENTION

This invention pertains to methods for making data storage cards. This invention also pertains to non-rotating magnetic recording media.

Credit cards and automatic teller cards typically contain strips of magnetic recording media for storing about 250 bytes of data. Such cards typically comprise a plastic such as PVC with particulate media applied thereto in the form of a strip. The particulate media comprise magnetic particles suspended in a binder, applied to the card by a process such as silk screen printing. The magnetic particles are typically an iron oxide particle such as $\gamma$ $Fe_2O_3$.

Particulate media in a binder are used in other types of memory applications, e.g. magnetic tape. While particulate media are adequate for certain applications, there is a limit to the data recording density that can be achieved using such media. Since magnetic tape can be made very thin, and a large amount of tape can be stored on a reel, particulate media type magnetic tape remains practical, despite the data storage density limitations of particulate media.

One can achieve much greater recording density using thin film recording media. As its name implies, thin film media comprise a thin, continuous magnetic film such as a cobalt alloy film. Such films are typically formed by sputtering onto a substrate. The major application for thin film magnetic recording media is hard magnetic disks.

While it might be tempting to try to sputter a magnetic film directly onto a plastic card, there are a number of problems that one would have to solve first.

1. Sputtering is typically done in a high vacuum environment. Accordingly, if one wanted to sputter onto a credit card, one would have to find a credit card material that would not out-gas contaminants that would poison the sputtering process.
2. Many sputtering processes are performed at high temperatures. Accordingly, one would have to either use a low temperature sputtering process, or find a plastic material that could survive high temperatures. Since one can generally achieve greater recording density using high temperature sputtering processes, it would be desirable to find a way to use high temperature sputtering processes when making credit cards.

Current specifications for credit cards require that they be flexible. Accordingly, magnetic recording structures within such a card should preferably be bendable. The credit card should also be inexpensive to manufacture, and should also be reliable.

It is an object of some embodiments of the present invention to provide a new method for manufacturing a credit card type data storage device using thin film technology.

It is also an object of some embodiments of the present invention to provide a credit card data storage device using thin film recording media.

SUMMARY

A method in accordance with the invention comprises the step of sputtering a thin magnetic film on a thin substrate, and then affixing the substrate to a credit card. The thin substrate is sufficiently flexible such that it can be mounted on the credit card. In one embodiment, the substrate is a silica-containing material such as glass or glass ceramic. Alternatively, the substrate can be a metal foil. Of importance, in some embodiments the substrate is capable of withstanding the temperature used in a high temperature sputtering apparatus.

The card need not be a credit card. In other embodiments, it is an identification card, or other form of data storage card.

DETAILED DESCRIPTION

A method in accordance with the invention begins with the step of providing a thin, flexible substrate, depositing a magnetic film on the thin, flexible substrate, and applying the thin flexible substrate to a credit card type device. The thin, flexible substrate can be used in a high temperature sputtering process without melting, decomposing, or otherwise changing in a detrimental way. Further, the flexible substrate does not outgas contaminants during sputtering.

After depositing a magnetic thin film on the flexible substrate, the substrate is cut into strips, each strip having a magnetic film thereon. The strip is then affixed to a plastic card.

First Embodiment of the Plastic Card

Figure 1A:
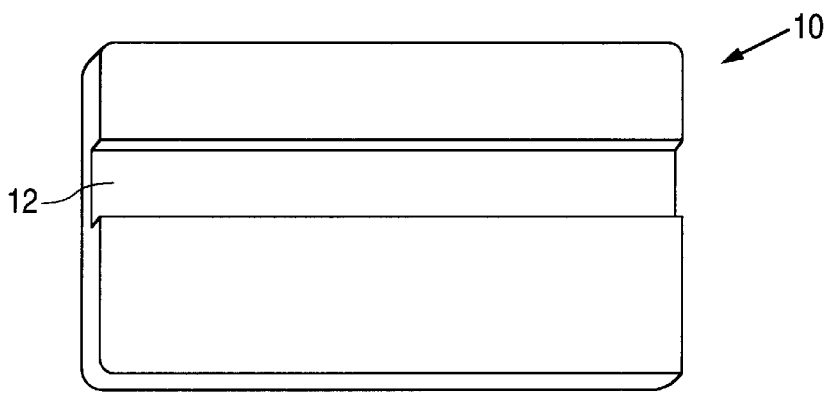
FIG. 1A illustrates a plastic card before a magnetic strip is affixed thereto.

FIG. 1A illustrates a plastic card 10 for use during a method in accordance with the invention prior to affixing a magnetic strip to card 10. Card 10 is typically made from a plastic material such as PVC, PTEG, or PVCA. Card 10 is typically the size of a credit card, i.e. 3.370 inches long (85.6 mm), 2.125 inches wide (53.97 mm) and 0.030 inches thick (0.76 mm). However, these dimensions are merely exemplary, and other sizes can also be used. An indentation or notch 12 is formed in card 10 where a magnetic strip will be placed. Indentation 12 is typically between 10 and 25 mm wide, and about 0.3 mm deep. (Card 10 is typically about 0.76 mm thick.) As explained below, a magnetic strip is affixed to card 10 at indentation 12.

I. First Embodiment of a Method for Making a Magnetic Strip

Figure 2:
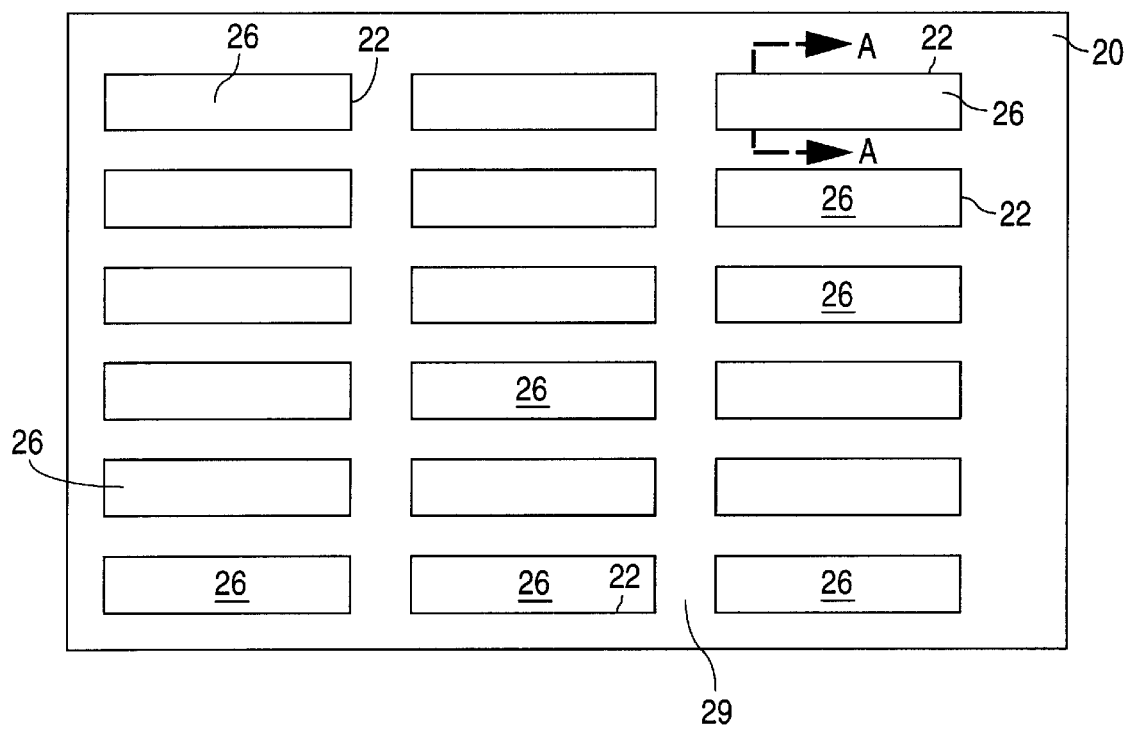
FIG. 2 illustrates in plan view a thin glass sheet after it has been subjected to laser scribing to define glass strips affixed to a glass frame.
Figure 2A:
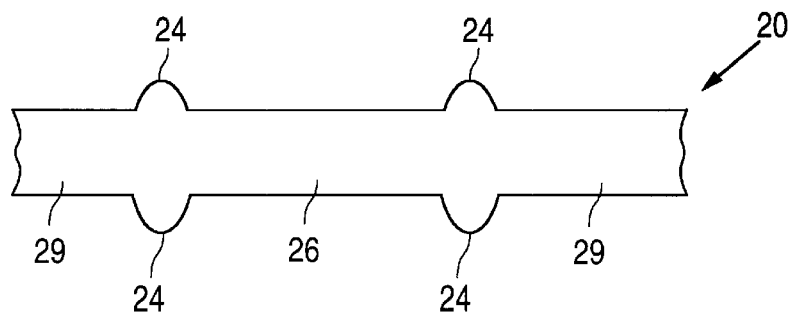
FIG. 2A illustrates in cross section a portion of the glass sheet of FIG. 2 along lines A—A after laser scribing has occurred.

During a method in accordance with the invention, one forms a magnetic strip, and affixes the magnetic strip to card 10. A first embodiment of a method for making the magnetic strip comprises the step of providing a sheet 20 of thin glass (FIG. 2). Sheet 20 can be a borosilicate or aluminosilicate glass or other type of silica-containing glass. In addition, sheet 20 can be a glass ceramic sheet. In one embodiment, sheet 20 is in the form of a square about 6.75 inches by 6.75 inches (171.45 mm by 171.45 mm), and about 0.3 mm or less thick. Sheet 20 can be formed by the float method or down drawing. Sheet 20 is subjected to a laser scribing step during which a laser, such as a $CO_2$ laser, is used to form scribe lines, e.g. lines 22. (Typically, both sides of sheet 20 are subjected to the laser beam. The laser beam has a wavelength that is readily absorbed by glass.) FIG. 2A shows some of the laser scribe lines in cross section along lines A—A. As can be seen, application of the laser to glass sheet 20 results in the formation of ridges 24.

Scribe lines 22 are used to define rectangular strips 26. Strips 26 are eventually separated, and affixed to card 10.

Figure 3:
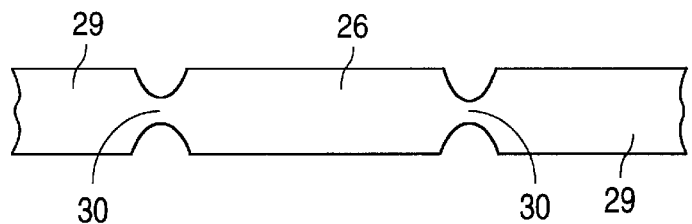
FIG. 3 illustrates in cross section the portion of the glass sheet of FIGS. 2 and 2A along lines A—A after it has been subjected to etching.

Glass sheet 20 is then subjected to an etching process. This etching process is typically performed using an aqueous acidic fluorine-containing solution. In one embodiment, the solution comprises hydrofluoric acid. In another embodiment, the solution comprises ammonium bifluoride mixed with phosphoric acid, sulfuric acid, or other type of acid and surfactant. In one embodiment, the etching solution comprises 5 wt. % ammonium bifluoride and 5% by volume of $H_2SO_4$. The surfactant can be toluene sulfonic acid, e.g. sold as Eltesol TSX/A, manufactured by Albright & Wilson Corp. During etching, the etching solution is subjected to ultrasonic agitation, e.g. at a frequency between 28 KHz and 68 KHz, e.g. 40 KHz. The etching solution can be at room temperature. In another embodiment, the etching solution can be as described in U.S. patent application Ser. No. 09/391,140, filed Sep. 7, 1999 by Homola et al., or U.S. patent application Ser. No. 09/390,887, filed Sep. 7, 1999 by Homola. The '140 and '887 applications are incorporated herein by reference. The portions of glass sheet 20 subjected to the laser beam etch more rapidly than the other portions of glass sheet 20. (This increase in the etch rate is discussed in U.S. patent application Ser. No. 09/391,139, filed by Hsieh et al. on Sep. 7, 1999, incorporated herein by reference.) FIG. 3 illustrates in cross section glass sheet 20 along lines A—A after this process has been completed. As can be seen, after etching, sheet 20 comprises a frame portion 29 coupled to a set of glass rectangular strips 26 via thinned glass regions 30 where scribe lines 22 were formed.

When glass sheet 20 is formed by the float method, some tin may diffuse into the glass sheet. Optionally, a second etching step is performed on glass sheet 20 during which the portions of glass sheet 20 that contain tin are etched away. (This etching step also strengthens glass sheet 20 by removing portions of the glass that contain defects and microcracks.) After etching, glass sheet 20 is cleaned.

Optionally, hard particles are applied to glass sheet 20, e.g. alumina, silica, diamond-like carbon or zirconia particles. The hard particles can be provided by a dip process, spray process, or a spinning on process. The particles are suspended in a liquid which, after drying, cause the particles to adhere to the glass. These particles provide enhanced mechanical support for a magnetic head that will subsequently pass over the magnetic layer. (Without adequate support, the head can eventually abrade or wear down the magnetic layer.)

In lieu of applying the above-mentioned hard particles to glass sheet 20, these materials can be sputtered onto glass sheet 20. If zirconia is used in this embodiment (or the previous embodiment), the zirconia can be stabilized, e.g. with yttria.

Figure 4:
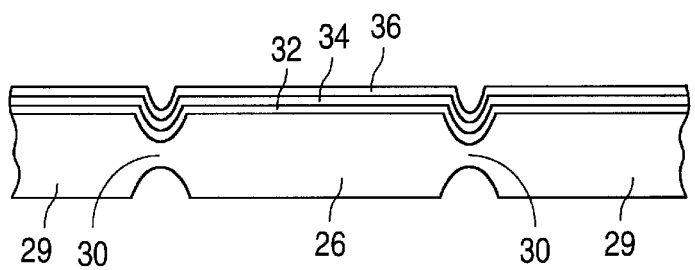
FIG. 4 illustrates in cross section the glass sheet of FIGS. 2 and 2A along lines A—A after an underlayer, magnetic layer and protective overcoat have been sputtered onto the glass sheet.

Sheet 20 is then mounted on a backing plate or pallet (not shown) and subjected to a sputtering process during which an underlayer 32, magnetic layer 34 and protective overcoat 36 are deposited, e.g. by sputtering, on sheet 20. During this process, the pallet or backing plate carries sheet 20 past sputtering targets that form layers 32, 34 and 36. (Layers 32, 34 and 36 are illustrated in FIG. 4, which shows in cross section one of strips 26 along lines A—A of FIG. 2.) In one embodiment, the underlayer is a material such as Cr or a Cr alloy. Of importance, Cr or a Cr alloy enhances certain magnetic characteristics, e.g. the coercivity, of the magnetic layer 34. Magnetic layer 34 is typically a Co or Fe alloy. In one embodiment, magnetic layer 34 can comprise other materials, such as Pt, which raises the coercivity of the magnetic layer and Cr which helps prevent corrosion. In one embodiment, magnetic layer 34 is a CoCrPtTaB alloy. Protective overcoat 36 can be, for example, a ceramic material such as $ZrO_2$ (or $Y_2O_3$-stabilized $ZrO_2$), a carbon overcoat, or a hydrogenated carbon overcoat.

Glass sheet 20 is typically heated, e.g. between 150 and 300° C. or higher during or immediately prior to sputtering. In one embodiment, sputtering is performed at 350° C. Sputtering at a high deposition temperature permits one to achieve higher magnetic coercivity. Of importance, glass is able to withstand such deposition temperatures without decomposing.

In another embodiment, during or immediately prior to sputtering sheet 20 is heated to a temperature just below the softening point of the sheet 20 material (e.g. about 600° C.).

After the above-mentioned layers are sputtered, a lubricant layer is applied to the protective overcoat. In one embodiment, the lubricant is a "bonded" lubricant such as a perfluoropolyether lubricant. Of importance, a portion of the perfluoropolyether lubricant molecules bond to the protective overcoat. This lubricant is typically applied by dipping, spraying or wiping the lubricant onto the protective layer, followed by a bonding process (e.g. a heating or UV exposure process).

In lieu of a bonded lubricant, a solid lubricant, e.g. graphite, $MoS_2$ or $WS_2$, is applied in a conventional manner to protective overcoat 36.

Figure 1B:
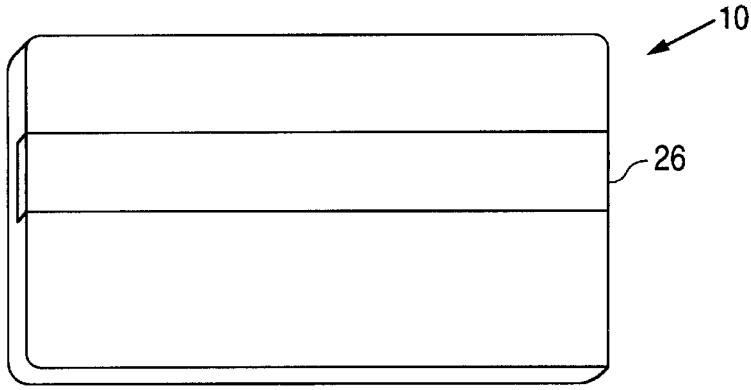
FIG. 1B illustrates the plastic card of FIG. 1A after the magnetic strip is affixed thereto.

Referring to FIG. 1B, after applying the lubricant, the individual rectangular strips 26 are separated from frame 29. This can be accomplished by applying mechanical force to strips 26 and frame 29. Separating strips 26 from frame 29 can also be accomplished by applying differential heating and/or cooling to frame 29 relative to strips 26 to thereby cause thermal stress and breaking along thinned regions 30. After strips 26 are separated from frame 29, strips 26 are affixed to a plastic card 10 in indentation 12 using a suitable adhesive or other bonding technique. After affixing the magnetic strip to the card, the magnetic strip is tested to ensure that it performs adequately.

It is noted that glass is usually a very rigid material, whereas card 10 must be flexible and capable of bending. However, if glass strips 26 are sufficiently thin (e.g. 0.3 mm or less), they will also be flexible. Thus, using glass as a substrate to make a magnetic strip is somewhat counterintuitive. In lieu of using glass, glass ceramic can also be used. In addition, ceramic materials such titanium carbide, aluminum boron carbide, and boron carbide can be used.

II. Second Embodiment of a Method for Making a Magnetic Strip

In one embodiment, the glass strip or sheet includes a texture layer formed thereon prior to deposition of underlayer 32. One way of doing this is to deposit a material such as a nickel alloy, e.g. NiP, on glass sheet 20 by sputtering and then mechanically forming linear texture marks on the NiP in the longitudinal direction of glass strips 26. Thereafter, underlayer 32, magnetic layer 34 and protective overcoat 36 are sputtered onto the textured NiP. Of importance, by providing this longitudinal texture in combination with a high temperature sputtering process that uses a Cr or Cr alloy underlayer, one can form an anisotropic magnetic film that permits higher magnetic recording density. This is achieved because magnetic coercivity is enhanced in the longitudinal direction of strip 26.

In another embodiment, the linear texture marks can be formed using a laser exposure and etching technique, e.g. as described in U.S. patent application Ser. No. 09/390,887, filed by Homola on Sep. 7, 1999.

The NiP can be laser zone textured. In other words, one applies laser pulses to the NiP to form texture bumps. Such texture bumps can reduce friction or stiction between the magnetic strip and apparatus used to read data recorded in the magnetic strip.

III. Third Embodiment of a Method for Making A Magnetic Strip

In another embodiment of our invention, instead of depositing three layers on glass strips 26, four layers are sputtered on glass strips 26 as follows:
1. A Cr or Cr alloy underlayer is deposited on glass strip 26.
2. A CoCrTa layer is deposited on the underlayer.
3. A magnetic alloy such as CoCrPtTaB is sputtered onto the CoCrTa layer.
4. A protective overcoat is then deposited onto the magnetic alloy layer.

The CoCrTa layer facilitates improved orientation of the grains of the magnetic alloy layer, and permits better lattice matching. These layers can be formed with a process such as described in U.S. patent application Ser. No. 08/984,753, filed by Bertero et al. on Dec. 4, 1997, incorporated herein by reference.

IV. Fourth Embodiment of a Method for Making a Magnetic Strip

In lieu of any of the above-described sputtering processes, an amorphous layer such as sputtered NiP alloy, a magnetic alloy, and a protective overcoat are sputtered onto glass sheet 20 at a low temperature (e.g. less than about 150° C., and generally between room temperature and 150° C.). (The NiP alloy can include alumina.) Such low temperature sputtering processes generally produce an isotropic magnetic film. In other words, the magnetic characteristics of the film are the same in any in plane direction.

V. Fifth Embodiment of a Method for Making a Magnetic Strip

The fifth embodiment is the same as the above embodiments, except the magnetic strips are separated from frame 29 prior to lubrication instead of after lubrication.

VI. Sixth Embodiment of a Method for Making a Magnetic Strip

Figure 5:
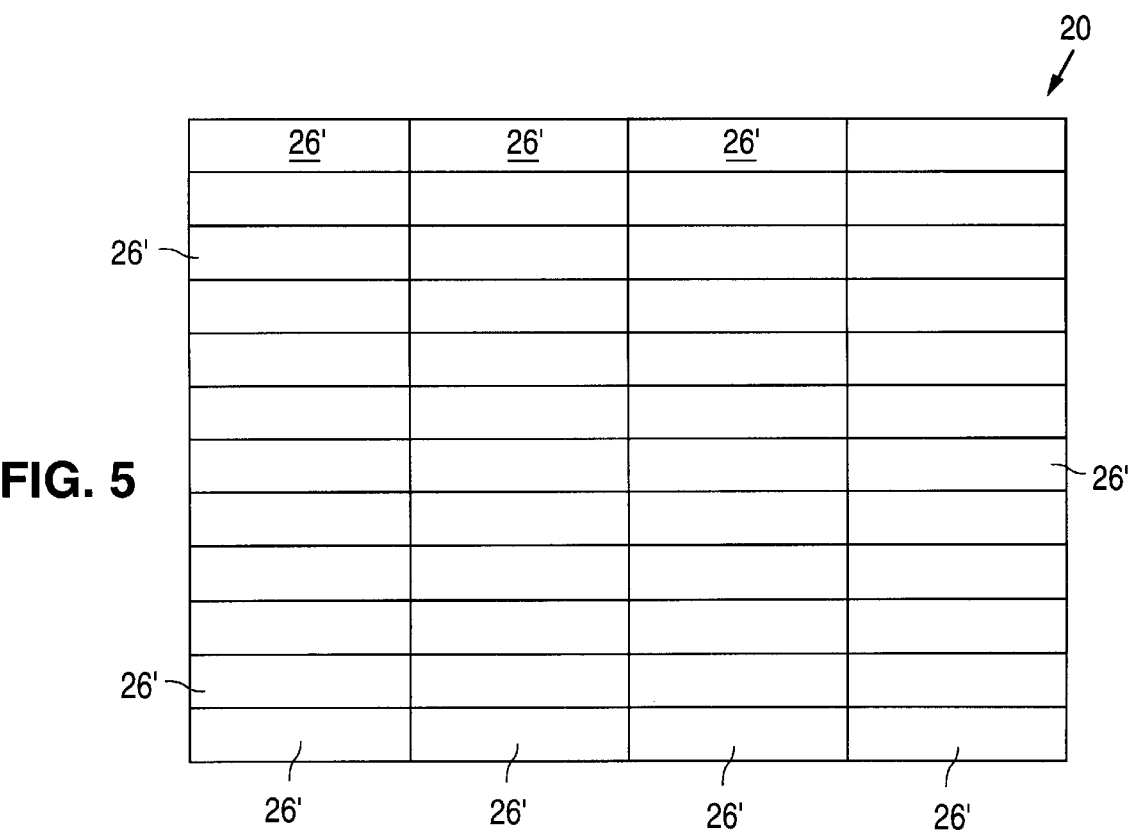
FIG. 5 illustrates in plan view a glass sheet after scribing in accordance with another embodiment of the invention in which the glass strips are not affixed to a frame.

Referring to FIG. 5, instead of using a set of glass strips 26 affixed to a glass frame, frame 29 is dispensed with, and glass sheet 20' is formed into a set of strips 26' which are connected to one another. One advantage of this method is that more strips can be formed on a sheet, since there is no frame.

VII. Seventh Embodiment of a Method for Making a Magnetic Strip

Figure 6A:
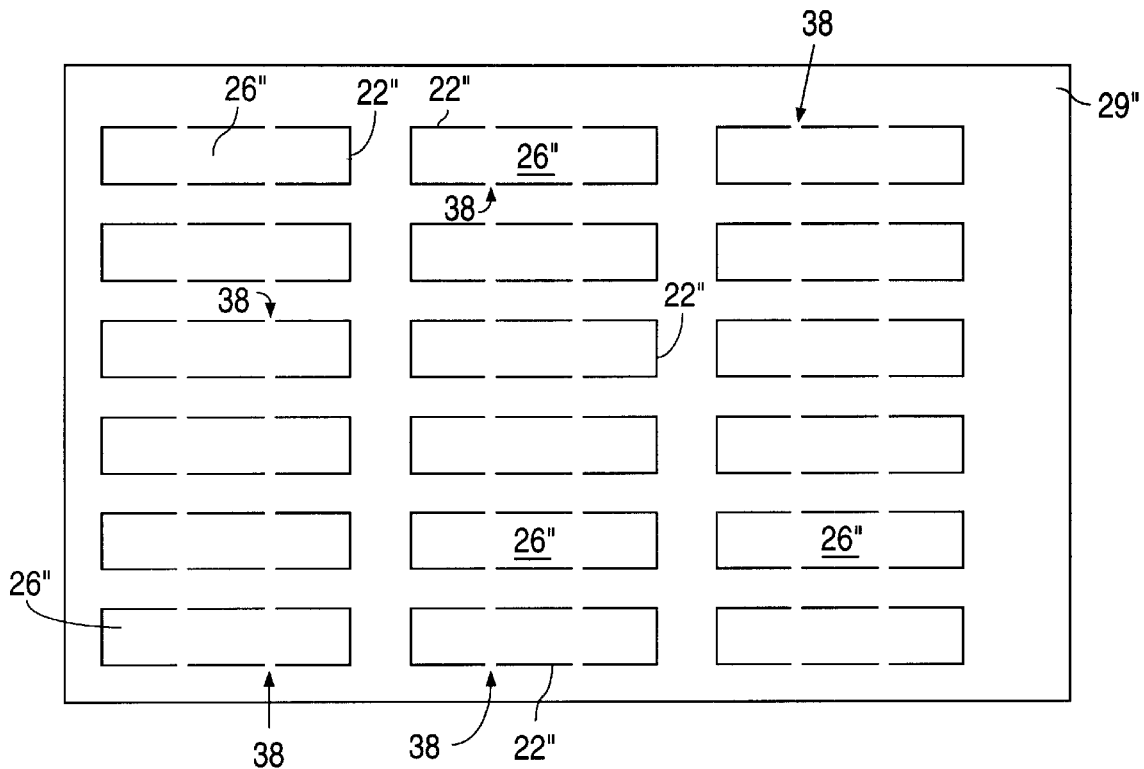
FIG. 6A illustrates in plan view a glass sheet after it has been laser scribed in accordance with another embodiment of the invention.
Figure 6B:
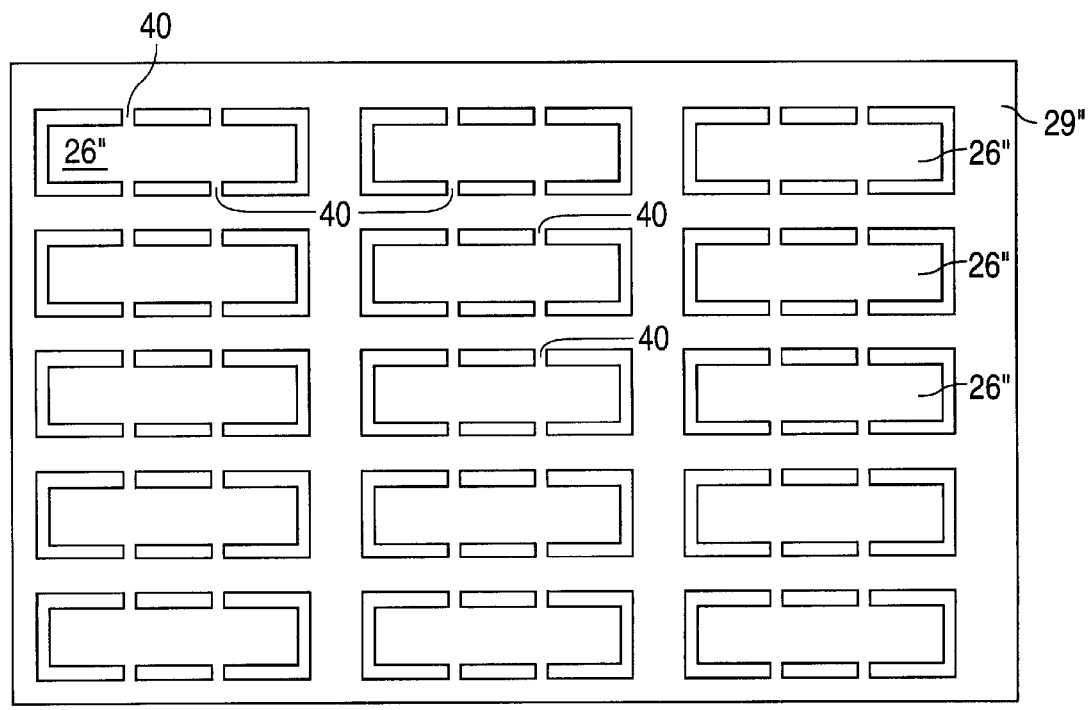
FIG. 6B the glass sheet of FIG. 6A after it has been etched.

Referring to FIG. 6A, instead of forming scribe lines that completely surround glass strips 26, glass sheet 20 is laser scribed so that laser scribe line 22" completely surrounds strips 26" except at regions 38. Sheet 20" is then subjected to an etching process so that portions of the glass surrounding strips 26" are completely removed except for portions of glass which form tabs 40 (FIG. 6B). (Tabs 40 are located where regions 38 were previously located.) Strips 26" are held to frame 29" via tabs 40.

After depositing the various sputtered layers on sheet 20", strips 26" are separated from frame 29" by breaking tabs 40. Strips 26" are then affixed to card 10 as described above.

In lieu of having strips 26" coupled to frame 29" via tabs 40, strips 26" can be coupled to each other via tabs 40 without a frame.

VIII. Eighth Embodiment of a Method for Making a Magnetic Strip

Figure 7:
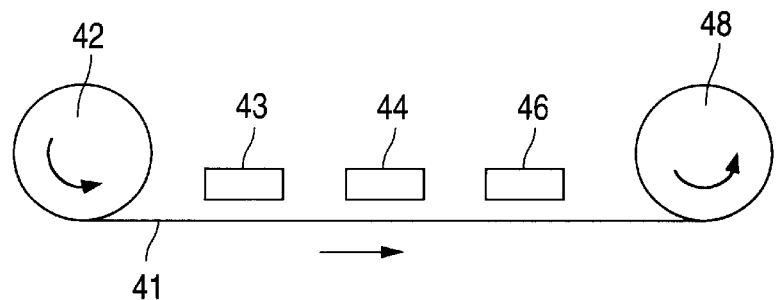
FIG. 7 illustrates a glass tape being fed through sputtering apparatus.

Referring to FIG. 7, in lieu of using a glass sheet comprising a set of glass strips, in one embodiment, a long, thin glass tape 41 from a supply reel 42 is passed underneath sputtering targets 43, 44 and 46, and is then taken up on a take-up reel 48. Targets 43, 44 and 46 provide an underlayer, a magnetic layer and a protective overcoat. After sputtering, reel 48 is removed from the sputtering apparatus, and tape 41 is cut into individual strips to be mounted onto card 10.

In one embodiment, tape 41 is mechanically cut into strips after sputtering. In another embodiment, prior to sputtering, scribe lines are formed in tape 41 so that tape 41 can easily be separated into strips after sputtering. In another embodiment, prior to sputtering, tape 41 is laser scribed and etched to form thinned regions so that the tape can easily be separated into strips after sputtering.

IX. Ninth Embodiment of a Method for Making a Magnetic Strip

Figure 8:
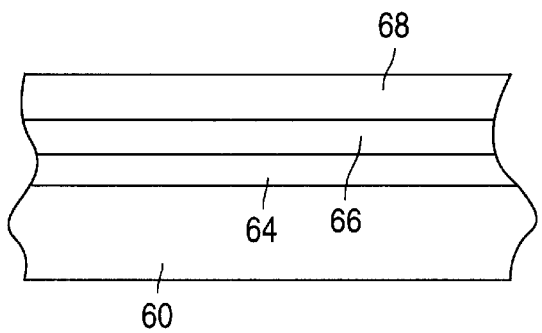
FIG. 8 illustrates in cross section a metal foil coated with an underlayer, a magnetic layer and a protective overcoat.

Referring to FIG. 8, a thin metal foil 60 mounted on a pallet or backing plate is introduced into sputtering apparatus. Foil 60 can be Cu, Be, W, Ti, Ta, brass, stainless steel or other appropriate metal, and is typically 0.3 mm thick or less. Foil 60 is flexible. An underlayer 64, a magnetic alloy 66 and a protective overcoat 68 are deposited on thin metal foil 60 in that order. As with the previous embodiment, the underlayer can comprise a material such as Cr or a Cr alloy, NiAl or NiP. The magnetic alloy is typically a Co or Fe alloy. The protective overcoat can be a ceramic material or carbon.

A lubricant is then applied to protective overcoat 68. Foil 60 is then cut, e.g. using a laser, EDM apparatus (electrical discharge machinery) or other appropriate cutting technique. Thereafter, coated foil 60 is affixed to card 10, e.g. using an adhesive. The card may then be tested, as in other embodiments.

In another embodiment, foil 60 can be in the form of a strip provided on a reel such as reel 42, and can be passed under sputtering targets in a manner similar to glass tape 41 described above in conjunction with FIG. 7.

Alternate Embodiments of the Card Structure

Figure 9:
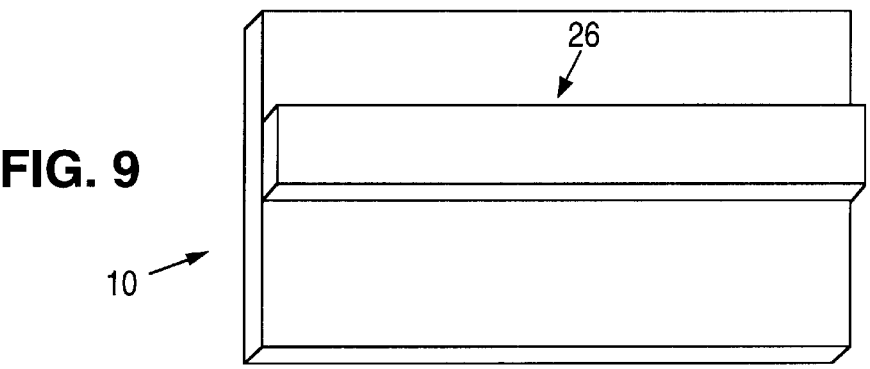
FIG. 9 illustrates a card comprising a magnetic strip wherein there is no notch cut into the card prior to applying the strip.

As mentioned above, in one embodiment, notch 12 is formed in card 10. In an alternate embodiment, notch 12 is not formed in card 10. In this alternate embodiment, strip 26 is simply affixed to card 10, e.g. as shown in FIG. 9.

In another embodiment, a notch is formed on each side of card 10, and a magnetic strip is affixed to each notch.

Figure 10:
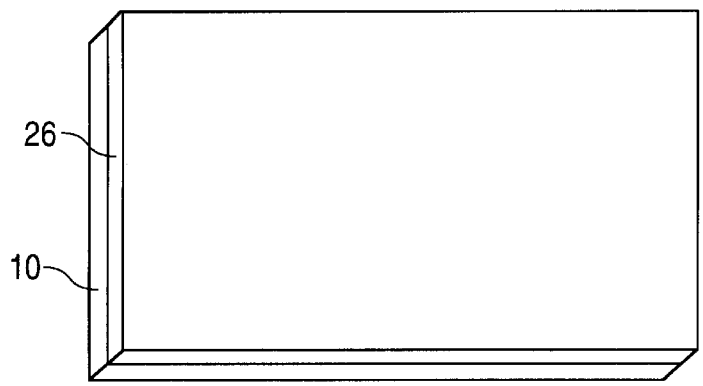
FIG. 10 illustrates a card comprising a magnetic strip in which the strip covers an entire surface of the card.

In yet another alternate embodiment, strip 26 is dimensioned so as to cover approximately one entire surface of card 10, e.g. as shown in FIG. 10. Advantageously, more data can be stored on the strip because it is larger.

Figure 11:
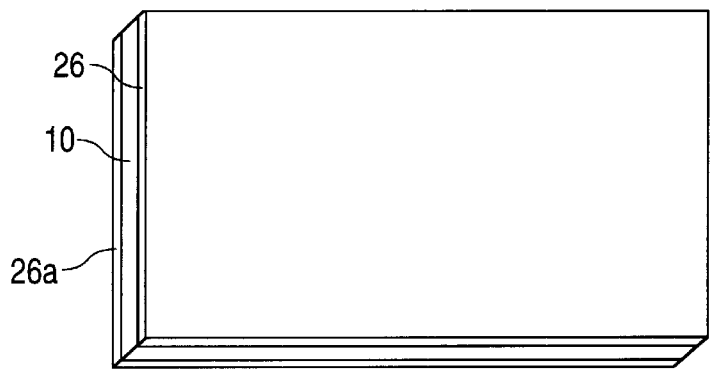
FIG. 11 illustrates a card comprising a magnetic strip in which strips are applied to both major surfaces of the card.

In another alternate embodiment, strip 26 is dimensioned to cover an entire surface of card 10, and another strip 26a is applied to the other surface of card 10 (FIG. 11). Strip 26a may or may not have magnetic layers formed thereon, but in either case is preferably made from the same material as the substrate of strip 26 (e.g. glass). By providing strip 26a on the other side of card 10, the card is mechanically more symmetrical and therefore more reliable. Advantageously, if strip 26a is transparent, one can read information printed on card 10 through strip 26a.

Figure 12:
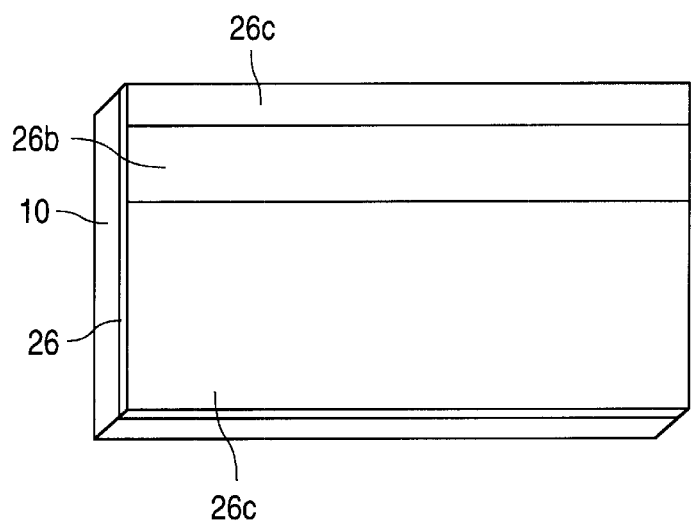
FIG. 12 illustrates a card in which a strip covers an entire surface of the card, but magnetic material is provided on only a portion of the strip.

In an alternate embodiment, strip 26 is dimensioned to cover the entire surface of card 10, but only a portion 26b of strip 26 has any layers sputtered thereon (FIG. 12). The other portions 26c of strip 26 do not have any layers sputtered thereon. One advantage of this embodiment is that one does not have to cut a notch in card 10, but nonetheless the surface of card 10 is smooth. Another advantage of this embodiment is that if the substrate material of strip 26 is transparent (e.g. glass), one can read information printed on the surface of card 10 that is covered by portions 26c of strip 26. The sputtered layers can be confined to portion 26b of strip 26 in one of the following ways.

Figure 13:
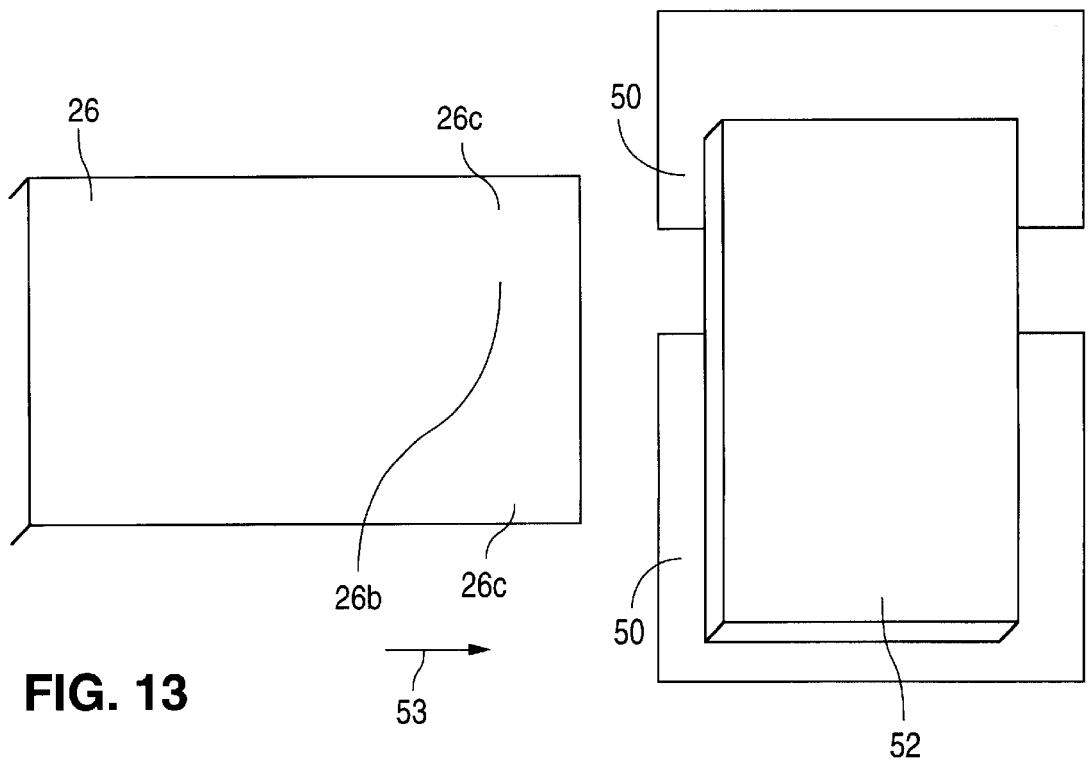
FIG. 13 illustrates a strip passing by a sputtering target in which means are provided for ensuring that magnetic material is deposited on only a portion of the strip.
Figure 14A:
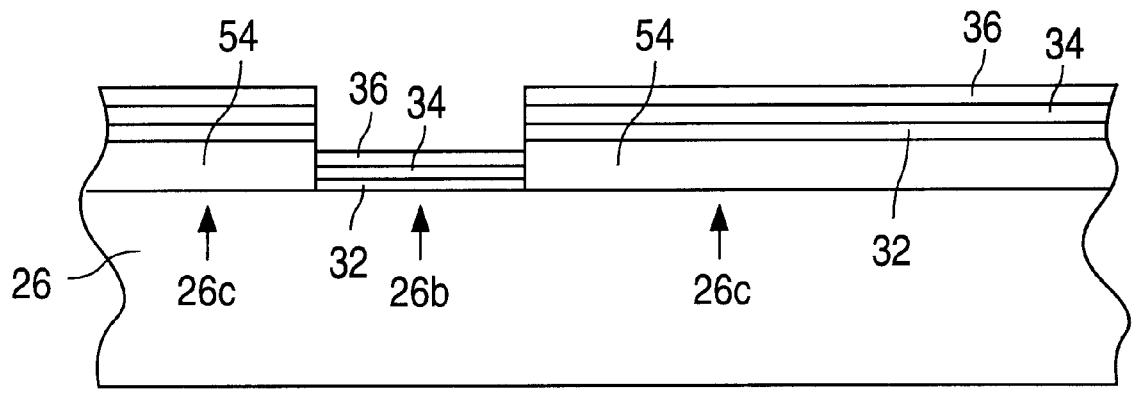
FIGS. 14A and 14B illustrate a lift-off process during which magnetic material is provided on a first portion of a strip but not a second portion.
Figure 14B:
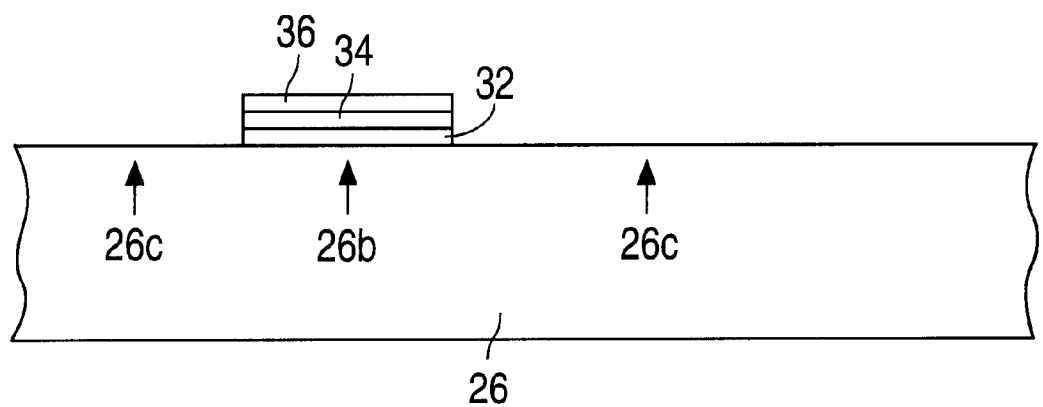

1. After the various layers are sputtered onto strip 26, strip 26 is subjected to a lithographic masking and etching process to remove those portions of the sputtered layers from portion 26c of strip 26.
2. Alternatively, during sputtering, walls or sheets 50 are interposed between the sputtering targets (e.g. target 52) and portions 26c of strip 26 as strip 26 moves in the direction of arrow 53 past the targets (FIG. 13). These walls or sheets block sputtered material from landing on and adhering to portions 26c of strip 26. Accordingly, when strip 26 emerges from the sputtering process, the sputtered layers are confined to portion 26b.
3. Alternatively, a resist layer 54 can be applied to strip 26 and exposed, and the portion of resist on portion 26b of strip 26 is removed. (See FIG. 14A, which illustrates a portion of strip 16 in cross section with resist layer 54 formed thereon.) Thereafter, underlayer 32, magnetic layer 34 and overcoat 36 are sputtered onto strip 26. After sputtering, the remaining portions of the resist 54 are removed, along with any sputtered layers on the resist. The result of this method is that sputtered layers are only present on portion 26b and not on portion 26c of strip 26.

While the invention has been described with respect to a specific embodiment, those skilled in the art will recognize that changes can be made in form and detail without departing from the spirit and scope of the invention. For example, the card and substrate materials can be any appropriate size or thickness. In lieu of sputtering, evaporation, ion plating, or other vacuum deposition techniques can be used. Features of one of the above-described embodiments can be incorporated into other above-described embodiments. In some embodiments, notch 12 does not span the entire length of the card. Also, there can be more than one magnetic strip on the card. Magnetic strips can be provided on both sides of the card. In one embodiment, the magnetic strip extends perpendicular to the length of the card, rather than parallel to the length of the card as shown in FIG. 1B.

In an embodiment in which the various layers are sputtered onto a glass or glass ceramic sheet such as sheet 20, the sheet can be cut mechanically after sputtering in lieu of scribing and breaking along the scribe lines. In yet another embodiment, glass sheet 20 is laser scribed but not etched after laser scribing. In this alternate embodiment, after laser scribing, the various layers are deposited (e.g. by sputtering) onto sheet 20, and then the magnetic strips are separated from frame 29 along the laser scribe lines, e.g. mechanically or by applying thermal stress along the laser scribe lines.

In another embodiment, scribing and etching of glass sheet 20 is accomplished after sputtering the various layers thereon. In yet another embodiment, scribing is performed after the various layers are sputtered onto glass sheet 20. The glass sheet is broken into strips without the above-mentioned etching step. Accordingly, all such changes come within the present invention.

I claim:

1. A method for making a card containing a data storage strip comprising:
   providing a silica-containing substrate;
   depositing a magnetic thin film layer on the substrate;
   separating the substrate into strips, said strips having a magnetic thin film layer thereon; and
   affixing at least one of said strips to a card.

2. Method of claim 1 further comprising the act of depositing an underlayer between said substrate and said magnetic thin film layer, and a protective overcoat over said magnetic thin film layer.

3. Method of claim 1 further comprising providing a texture layer over said substrate prior to the act of depositing said magnetic thin film layer, wherein said magnetic thin film layer is anisotropic.

4. Method of claim 1 further comprising:
   applying a laser to said substrate to form scribe lines, said scribe lines defining a set of strips; and
   etching said substrate, thereby leaving said strips coupled to a frame by a set of thinned regions.

5. Method of claim 4 wherein said act of depositing is performed on said substrate after said act of etching.

6. Method of claim 1 further comprising:
   applying a laser to said substrate to form scribe lines, said scribe lines defining a set of strips; and
   etching said substrate so that said substrate thereafter comprises a set of strips coupled to one another by a set of thinned regions.

7. Method of claim 6 wherein said act of depositing is performed on said substrate after said act of etching.

8. Method of claim 1 further comprising:
   applying a laser to said substrate to form scribe lines, said scribe lines defining a set of strips; and
   etching said substrate to thereby remove a portion of said substrate that has been exposed to said laser, thereby leaving said strips coupled to a frame by a set of tabs, said act of depositing being performed on said substrate after said act of etching.

9. Method of claim 1 further comprising:
   applying a laser to said substrate to form scribe lines, said scribe lines defining a set of strips; and
   etching said substrate to thereby remove a portion of said substrate that has been exposed to said laser, thereby leaving said strips coupled to one another by a set of tabs, said act of depositing being performed on said substrate after said act of etching.

10. Method of claim 1 wherein said substrate comprises glass or glass ceramic and said card comprises plastic.

11. Method of claim 1 wherein said act of depositing comprises sputtering.

12. Method of claim 11 wherein said act of sputtering is performed at a temperature greater than or equal to about 200° C.

13. Method of claim 11 wherein said act of sputtering is performed at a temperature less than or equal to about 400° C.

14. Method comprising:

depositing a magnetic film on a substrate;

lithographically removing a portion of said magnetic film on said substrate so that said magnetic film covers only a portion of said substrate; and applying said substrate to a card, wherein said magnetic film is a data recording film.

15. Method of claim 14 further comprising:

depositing an underlayer between said magnetic film and said substrate; and depositing a protective overcoat over said magnetic film.

16. Method comprising:

providing a first layer of material on a first portion of a substrate but not a second portion of said substrate;

depositing a magnetic data recording layer on said second portion of said substrate and first layer of material; and removing said first layer of material, thereby leaving said magnetic data recording layer on said first portion of said substrate but not said second portion of said substrate.

17. Method of claim 16 further comprising the act of affixing said substrate to a card.

18. Method comprising:

vacuum depositing a thin film magnetic recording layer on substrate material, wherein said vacuum depositing comprises sputtering;

separating said substrate material into strips; and affixing at least one of said strips to a card.

19. Method of claim 18 wherein said substrate material is at a temperature greater than or equal to about 200 degrees C. during said sputtering.

20. Method comprising:

vacuum depositing a thin film magnetic recording layer on substrate material, wherein said act of vacuum depositing comprises sputtering; and affixing said substrate material to a card;

sputtering an underlayer on said substrate prior to sputtering said magnetic recording layer; and sputtering an overcoat over said magnetic recording layer.

21. Method comprising:

forming scribe lines in a substrate, said scribe lines defining a set of regions in said substrate;

forming a magnetic data recording layer on said substrate; and separating said regions along said scribe lines after said act of forming a magnetic data recording layer.

22. Method of claim 21 wherein said act of forming a magnetic layer comprises sputtering said magnetic layer.

23. Method of claim 21 further comprising the act of forming an underlayer on said substrate prior to said act of forming said magnetic layer.

24. Method of claim 21 wherein after said forming, said regions comprise magnetic strips, said method further comprising affixing said strips to cards to thereby form data recording cards.

25. Method comprising:

providing a substrate, said substrate comprising a set of regions affixed to a frame by a set of tabs;

depositing a magnetic layer on said substrate; and separating said regions from said frame.

26. Method of claim 25 further comprising the act of depositing an underlayer on said substrate prior to said act of depositing said magnetic layer.

27. Method of claim 25 wherein said regions are magnetic strips, said method further comprising affixing said strips to cards to thereby form data recording cards.

28. Method comprising:

providing a substrate, said substrate comprising a set of regions affixed to one another by a set of tabs;

depositing a magnetic layer on said substrate; and separating said regions from one another.

29. Method of claim 28 further comprising the act of depositing an underlayer on said substrate prior to said act of depositing said magnetic layer.

30. Method of claim 28 wherein said regions are magnetic strips, said method further comprising affixing said strips to cards to thereby form data recording cards.

31. Method comprising:

providing a set of scribe marks on a tape;

forming a magnetic layer on said tape;

separating pieces of said tape from one another along said scribe marks, thereby forming a set of magnetic strips.

32. Method of claim 31 further comprising the act of depositing an underlayer on said tape prior to said act of forming.

33. Method of claim 31 further comprising affixing said strips to cards to thereby form data recording cards.

34. Method of claim 31 wherein said tape comprises glass.

35. Method of claim 31 wherein said providing said set of scribe marks is accomplished before said forming of said magnetic layer and said separating pieces of said tape from one another is performed after said forming of said magnetic layer.

36. Method of claim 1 wherein said magnetic thin film layer comprises a continuous Co alloy or a Fe alloy data recording film.

37. Method of claim 1 wherein said affixing comprising affixing said strips to associated cards.

38. Method of claim 1 wherein said at least one strip is dimensioned to cover the entire surface of said card.

39. Method of claim 1 wherein said affixing is accomplished using an adhesive.

40. Method of claim 2 wherein said underlayer comprises Cr or a Cr alloy.

41. Method of claim 4 wherein said applying of said laser creates a bump where said laser is applied to said substrate, and said etching thins those regions of said substrate where said bump is formed.

42. Method of claim 14 wherein said applying is accomplished using an adhesive.

43. Method of claim 19 wherein said substrate comprises glass.

44. Method of claim 20 wherein said sputtering is performed before said affixing.

45. Method of claim 1 wherein at the conclusion of said method, said card with said at least one strip affixed thereto is flexible.

46. Method of claim 43 wherein at the conclusion of said method, said card with said at least one strip affixed thereto is flexible.

* * * * *

UNITED STATES PATENT AND TRADEMARK OFFICE
CERTIFICATE OF CORRECTION

PATENT NO.   : 6,482,330 B1
DATED        : November 19, 2002
INVENTOR(S)  : Christopher H. Bajorek It is certified that error appears in the above-identified patent and that said Letters Patent is hereby corrected as shown below:

<u>Title page,</u>
Item [75], the following inventor should be added:
-- Donald C. Mann, Thousand Oaks, CA (US) --.

Signed and Sealed this

Thirteenth Day of May, 2003

JAMES E. ROGAN
*Director of the United States Patent and Trademark Office*